L. VAN AUKEN.
EGG CARRIER.
APPLICATION FILED SEPT. 24, 1913.

1,114,825.

Patented Oct. 27, 1914.
3 SHEETS—SHEET 1.

Witnesses
Edward W. Holmes
C. N. Walker

Inventor
Lansing Van Auken
By Blackwood Bros
Attorneys

L. VAN AUKEN.
EGG CARRIER.
APPLICATION FILED SEPT. 24, 1913.
1,114,825.
Patented Oct. 27, 1914.
3 SHEETS—SHEET 2.
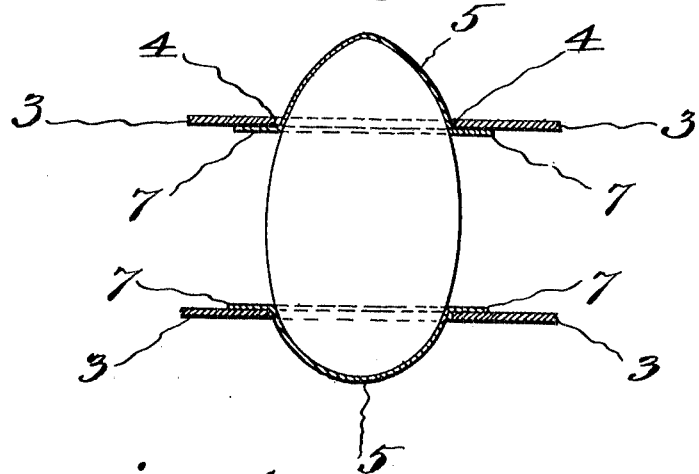
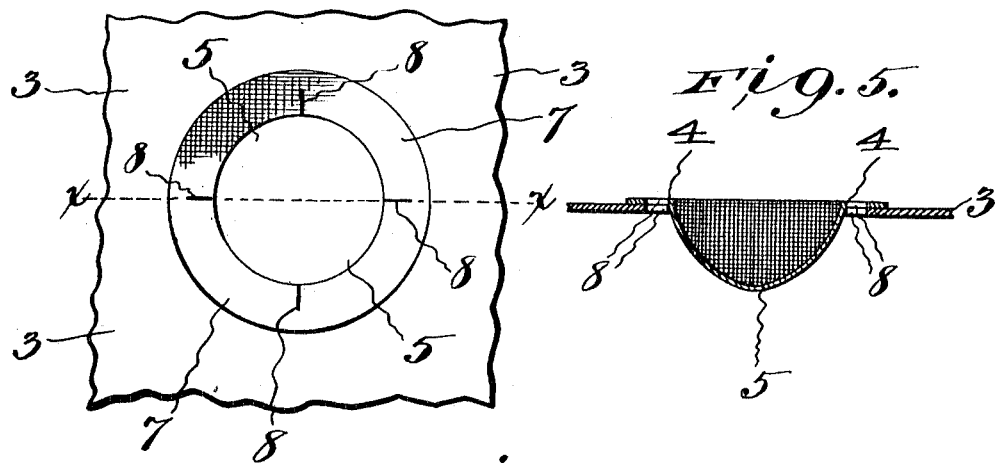
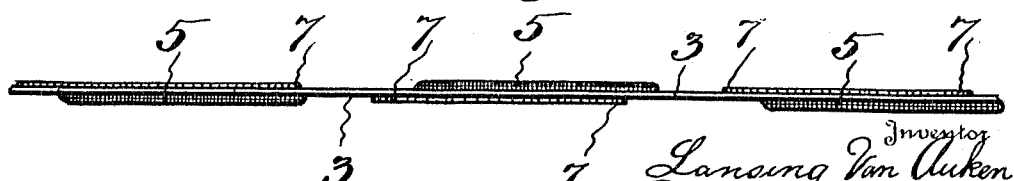
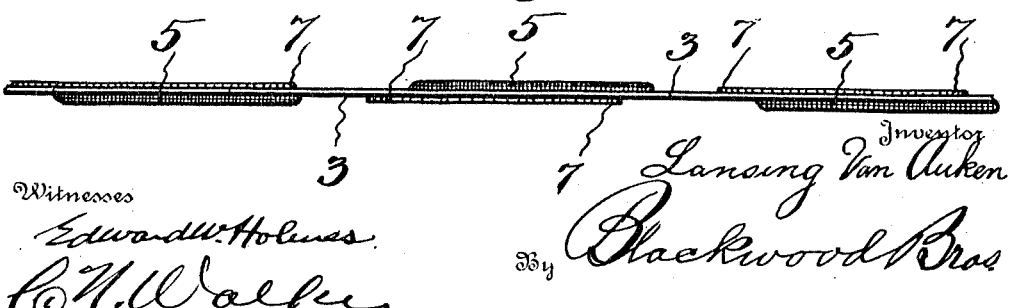
Inventor
Lansing Van Auken
By Blackwood Bros
Attorneys
Witnesses
Edward W. Holmes
C. H. Walker L. VAN AUKEN.
EGG CARRIER.
APPLICATION FILED SEPT. 24, 1913.
1,114,825.
Patented Oct. 27, 1914.
3 SHEETS—SHEET 3.
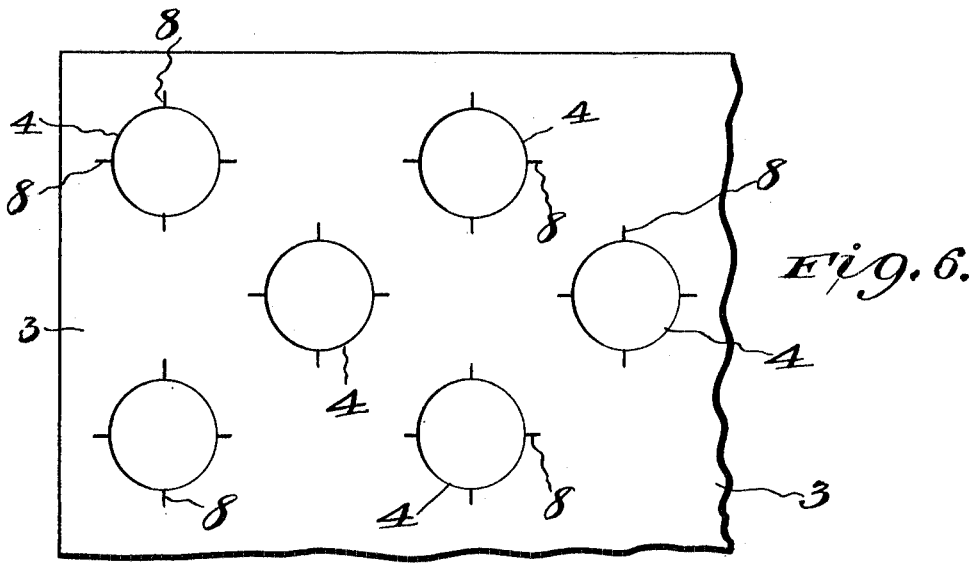
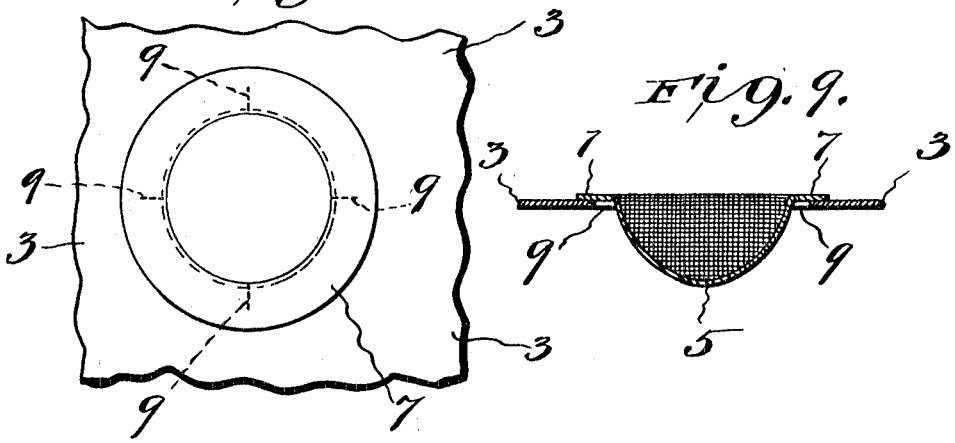
Witnesses
Edward W. Holmes
C. N. Walter
Inventor
Lansing Van Auken
By Blackwood Bro.
Attorneys

UNITED STATES PATENT OFFICE.

LANSING VAN AUKEN, OF WATERVLIET, NEW YORK.

EGG-CARRIER.

1,114,825.   Specification of Letters Patent.   Patented Oct. 27, 1914.

Application filed September 24, 1913. Serial No. 791,540.

*To all whom it may concern:*

Be it known that I, LANSING VAN AUKEN, a citizen of the United States, residing at Watervliet, in the county of Albany and State of New York, have invented certain new and useful Improvements in Egg-Carriers, of which the following is a specification.

My invention relates to improvements in egg carriers and more particularly to means for packing eggs therein.

The object of the invention is to provide an egg carrier which will contain a maximum number of eggs in a minimum amount of space and thereby increase the carrying capacity of the carrier.

A further object is to provide means for effecting perfect ventilation to promote the preservation of eggs.

A further object is to provide means for securely retaining the eggs in the carrier by means of pressure and at the same time efficiently protect them and prevent breakage.

A further object is to provide means for compensating for the various sizes and contours of the eggs.

A further object is to provide a device which is inexpensive, simple and durable in construction and very efficient and handy when used.

A further object is to provide means whereby the pockets are adapted to be collapsed without breaking and allow the fillers to be packed closely together for shipment when not in use for holding eggs.

A further object is to provide fillers which are adapted to be spaced apart by means of the eggs held thereby.

The invention consists in the several features and combination of features as more fully hereinafter described and claimed.

Figure 1:
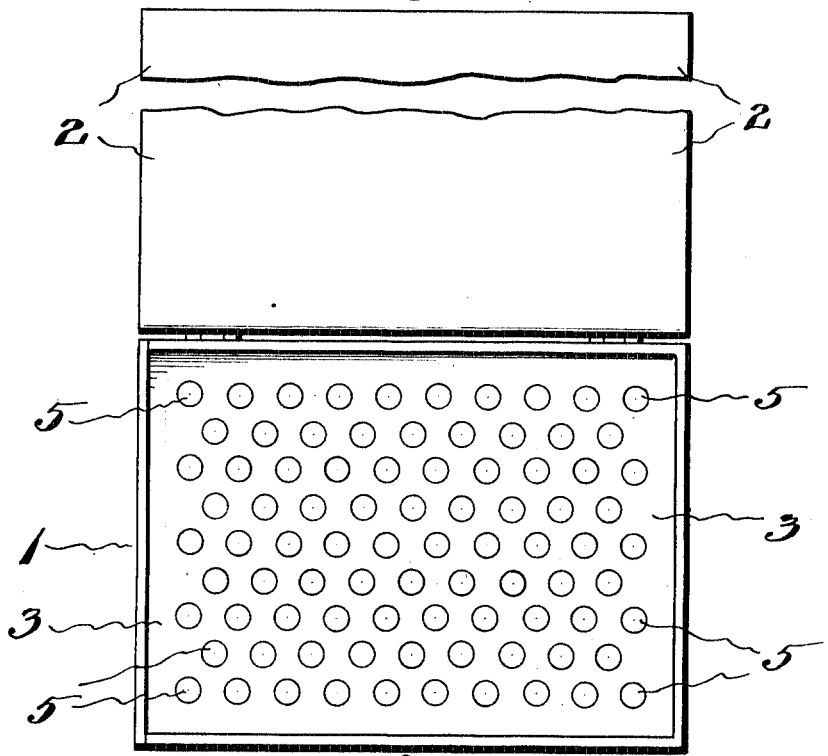
Figure 2:
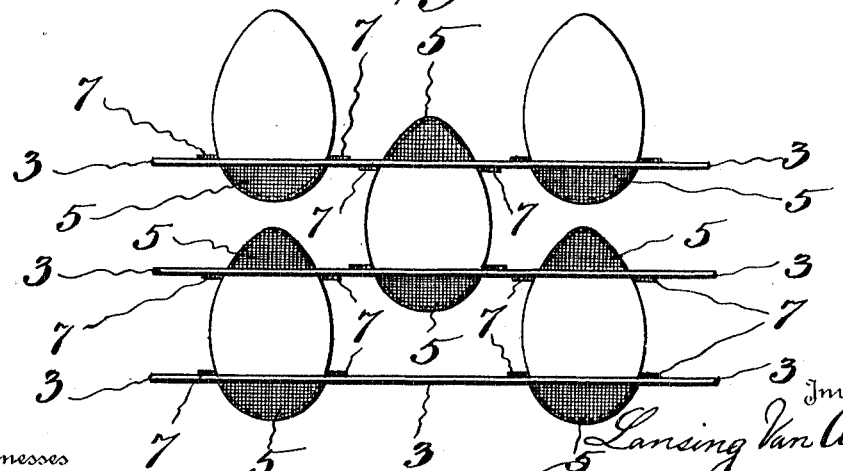

Referring to the drawings:—Figure 1 is a top plan view of an egg case, the cover or lid being opened, showing my invention in use therein. Fig. 2 a side view of 3 fillers with 3 series of rows of eggs in place. Fig. 3 an enlarged fragmentary sectional view of two fillers and an egg held between them. Fig. 4 a top plan view of one of the egg pockets and a portion of one of the fillers. Fig. 5 a sectional view taken on the line *x—x* of Fig. 4. Fig. 6 a top plan view of a portion of one of the fillers with the pockets removed. Fig. 7 a side view of one of the fillers showing the pockets collapsed ready for shipment. Fig. 8 a fragmentary plan view of another form of the invention. Fig. 9 a fragmentary sectional view of the form shown in Fig. 8

In the drawings in which like reference characters denote like parts throughout the several views, 1 represents an egg case having a cover or lid 2.

The fillers 3 preferably made of pasteboard, but which may be made of any other suitable material, are provided which are designed to be placed in the egg case in tiers one above the other and are provided with a number of rows of holes 4 which may be arranged in staggered relation to each other, as shown, or opposite each other and each hole 4 is provided with a flexible pocket 5 made of muslin, cheesecloth or other suitable material and is provided with a flange 7 which is secured to the filler by paste, glue or other means.

The pockets of one row project upward and are adapted to receive and hold one end of an egg while the pockets of the next or adjacent row project downwardly and are adapted to receive and hold the other end of an egg and for the purpose of compensating for various sizes and contours of eggs slits 8 are made in the edges of the holes 4 and extend through the inner portions of the flanges 7 of the pockets, said slits allowing the pockets to be expanded or enlarged both circumferentially and in length.

By reason of the pockets being made of flexible material they not only automatically conform to the shape of the end of the egg placed therein but when the eggs have all been removed from the fillers and case and it is desired to pack the fillers and ship them, together with the case, for another consignment of eggs said pockets can be collapsed and will lie flat on the surface of the fillers and allow the fillers to be packed closely together without any appreciable space between them.

When the fillers are placed in the egg case the upwardly and downwardly projecting pockets of adjacent fillers will be opposite each other and register, and when the eggs are placed in position in the pockets of the fillers they will space the fillers apart and receive all the pressure on their ends, where they are strongest, and the pressure will be uniformly distributed over the ends of all the eggs in the case.

In the form of the invention shown in Figs. 8 and 9 the holes in the fillers are provided with slits 9 but the flanges of the pockets are not slitted and are pasted over said slits.

I do not wish to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modification as properly fall within the scope of my invention and the terms of the following claims.

What I claim is—

1. In an egg carrier, a filler having holes and lateral slits extending from the edges of said holes, flexible pockets mounted in said holes, closed at one end and open at the other and having lateral slits registering with the slits in the edges of the holes of the filler, thereby providing means for compensating for eggs or varying sizes, substantially as described.

2. In an egg carrier, a filler formed of a plate, holes in said plate having lateral slits extending from their edges, for the purpose of allowing said holes in the fillers to be enlarged beyond their normal circumference, flexible pockets separate from said filler and having flanges secured around said holes and lateral slits in the inner portions of said flanges, substantially as described.

3. In an egg carrier, a filler formed of a plate having holes, in substantially the same horizontal plane as the plate, lateral slits extending outward from the edges of said holes, flexible expansible pockets having flanges secured around said holes in the filler plate and lateral slits in the inner portions of said flanges of said pockets, substantially as described.

4. In an egg carrier, a filler having holes and lateral slits extending from the edges of the holes, and flexible pockets mounted in said holes and surrounded by the slitted edges thereof, substantially as described.

In testimony whereof I have signed my name in the presence of two subscribing witnesses.

LANSING VAN AUKEN.

Witnesses:
J. E. TALLEY,
ROBERT R. DEW.

---

Copies of this patent may be obtained for five cents each, by addressing the "Commissioner of Patents, Washington, D. C."